Oct. 11, 1949.   E. F. PAIN   2,484,723
DRAIN VALVE
Filed April 15, 1946   2 Sheets-Sheet 1
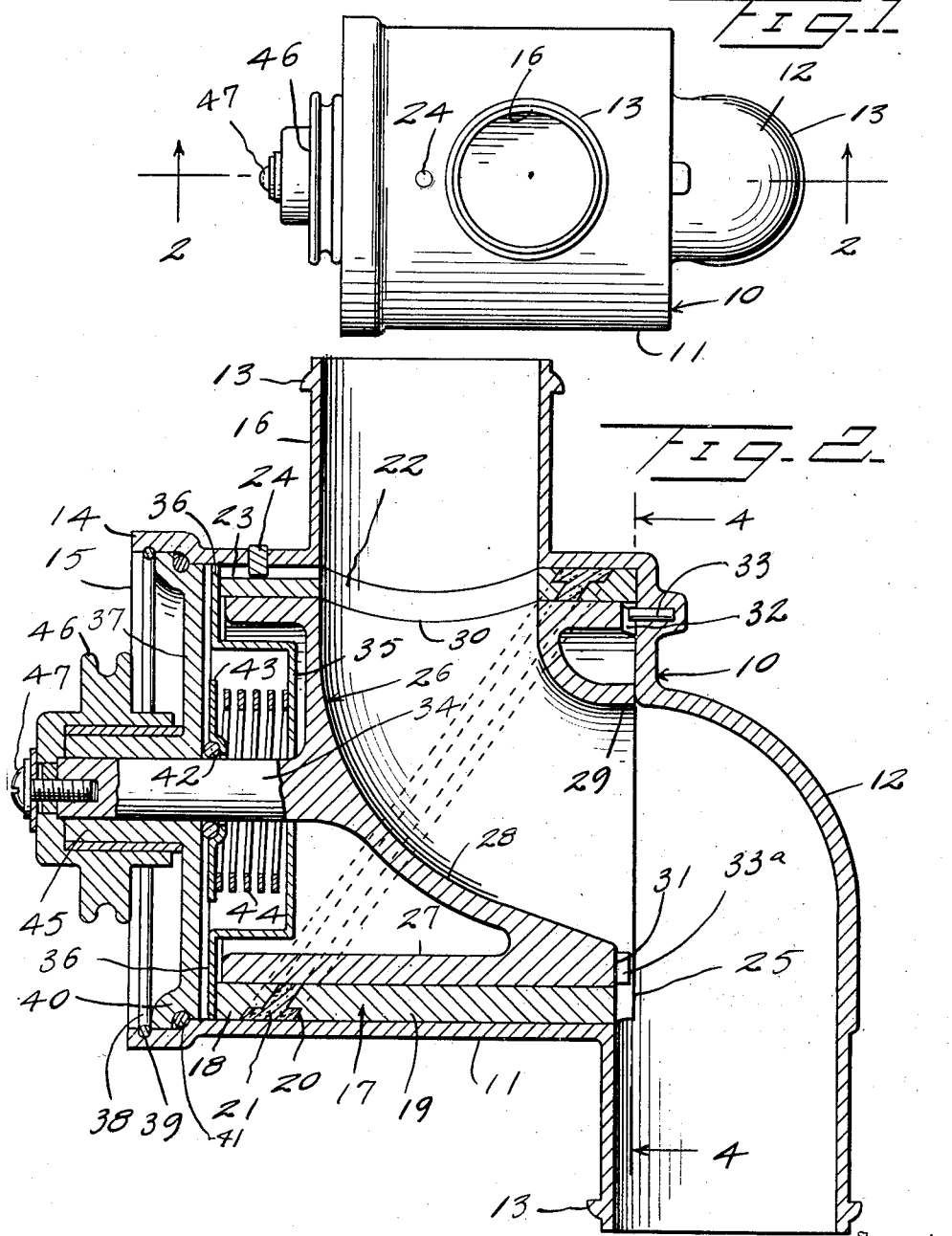
Inventor
E. F. Pain
By Kimmel & Crowell Attorneys

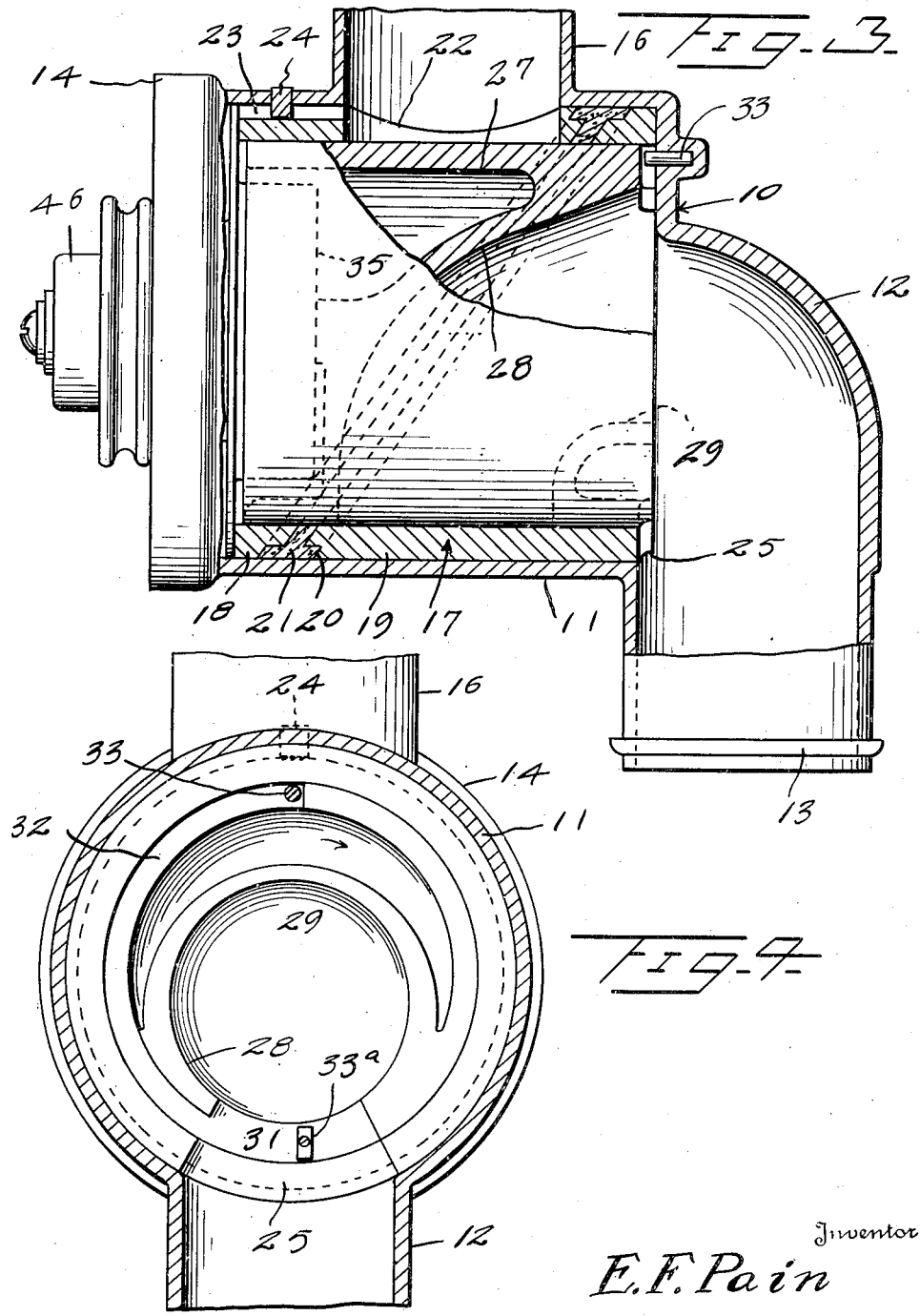

Patented Oct. 11, 1949

2,484,723

UNITED STATES PATENT OFFICE 2,484,723

DRAIN VALVE

Edwin F. Pain, Corry, Pa., assignor to Aero Supply Mfg. Co. Inc., Corry, Pa.

Application April 15, 1946, Serial No. 662,265

2 Claims. (Cl. 251—95)

This invention relates to a shut-off valve, and more particularly to a shut-off valve for drain applications.

It is an object of this invention to provide a shut-off valve which may be moved from the full open to the full closed position by a 180 degree turn of the valve.

Another object of this invention is to provide a 180 degree shut-off drain valve with relatively free flow characteristics.

Still another object of this invention is to provide a shut-off valve with a novel sealing means, wherein a resilient seal is placed angularly between two related sections of a valve bearing sleeve within the valve housing.

Yet another object of this invention is to provide a drain valve in which the fluid enters one end of the valve and in passing through the valve is turned by smoothly curved surfaces to provide for a relatively free flow of fluid.

Still another object of this invention is to provide drain valve which may be readily produced at a low cost and in which the seals and any damaged parts may be easily and quickly replaced.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a top plan view of the valve,

Figure 2 is a vertical section taken on the line 2—2 of Figure 1, with the valve in the open position, Figure 3 is a side elevation, partly in section of the valve, shown in the closed position, and Figure 4 is a vertical section taken on the line 4—4 of Figure 2.

Referring to the drawings the numeral 10 designates generally a valve housing constructed according to an embodiment of this invention. The housing 10 is formed with a cylindrical body 11 and a tubular elbow section 12 formed integral with the body 11 at one end of the body 11 and extending perpendicularly therefrom. The elbow 12 is formed at its free end with a partially rounded annular projection 13, whereby a tube or hose may be sealed upon engagement over the end of the elbow 12 being fastened thereto by any suitable fastening means.

The wall 14 at the other end of the body 11 is wider than the walls of the body 11 to form a wide opening 15 at the end of the cylindrical body 11.

The body 11 is also formed with a tubular projection 16 extending at right angles to the walls of the body 11. The center of the tube 16 is in the same plane as the elbow 12 but as the elbow 12 extends from an end of the body 11 and as the tube 16 extends from a side of the body 11, in a plane normal to the center lines of these two tubes they are offset. An annular rounded projection 13 is also formed on the free end of the tube 16.

A cylindrical sleeve 17 is adapted to slide into the cylindrical body 11 to form both a bearing and a seal for the valve. The sleeve 17 is formed into two complementary sleeve sections 18 and 19. The sleeve sections 18 and 19 are formed by cutting the cylindrical sleeve 17 angularly across the width thereof. The separation between the sleeve sections 18 and 19 is so formed as to present a T-shaped opening 20 between the sections 18 and 19 with the arms of the T-shaped opening outermost. A T-shaped seal 21 is placed between the sleeve sections 18 and 19 to form a seal between the sleeve 17 and the body 11.

The sleeve section 18 is formed along its longest side with an opening 22 to register with the opening of the tube 16. Adjacent the opening 22, the long side of the sleeve section 18 is formed with a longitudinal recess 23 into which a pin 24 extends to keep the sleeve 18 from turning and to align the opening 22 in the housing 10.

The sleeve 17 is engaged in the body 11 by sliding the section 19 into the body 11 with the short side uppermost leaving the passage to the tube 16 clear. The seal 21 is then put into place in the recess 20 of the sleeve section 19. The sleeve section 18 is then slid into place engaging the seal 21 and the pin 24, so that the opening 22 is properly aligned with the tube 16. The inner end of section 19 is formed with a partially round cutout section 25 to suit the contour of the elbow 12 and allow a smooth flow throughout the valve assembly.

The valve 26 is then inserted into the body 11, inside the sleeve 17. The valve 26 is formed of a cylinder 27 and a 90 degree elbow 28 formed therein. The elbow 28 is formed inwardly of the ends of the cylinder 27 and has an opening 29 smaller than the cylinder 27 in register with the opening of the elbow 12 at one end of the body 11. The walls of the elbow 28 then turn 180 degrees and the cylinder 27 is formed with an opening 30, registering with the opening 22, in sleeve 17, and tube 16 to form a complete passage between the tube 16 and the elbow 12.

The inner end of the wall of the cylinder 17 is formed with a small recess 31 adapted to align with the recess 25 to permit a smooth flow of fluid through the valve.

Another recess 32 is formed in the end of the wall of cylinder 27 and extends 180 degrees around the end of the cylinder 27 and terminates in a projection 33a. A pin 33 fixed in the end wall of the body 11 engages in the recess 32 to provide a stop for the valve 26 in the open and closed position. The extent of the recess 32 may however, be of such length as to limit the travel between positions to whatever value may be desired in a particular instance. A shaft 34 extends from the convex wall of the elbow 28 outwardly from the valve 26, concentric with the sleeve 17 and the body 11, whereby the valve 26 may be turned from outside of the body 11.

A cup-shaped spring seat 35 is inserted over the shaft 34 with the convex side innermost, and is formed with an annular flange 36, which bears against the outer end of the sleeve 17 and is adapted to press the sleeve 17 inwardly of the body 11 and compress the resilient members 21 to form a seal between members 10, 15, 19 and 26.

The valve cover 37 is held in place by a retainer ring 38 which fits into an annular groove 39 in the end wall 14 of the body 11. The cover 37 is formed with a rearwardly and outwardly extending flange 40 and a seal 41 is held by the flange 40 in place between the wide end wall 14 and the side walls of the body 11. Another seal 42 is held against the cover 37 and around the shaft 34 by a retainer 43. The spring 44, between the retainer 43 and the spring seat 35, presses the spring seat inwardly, to hold the sleeve 17 in place, and outwardly to hold the seal 42 closely about the shaft 34.

The cover 37 is formed with an outwardly extending boss 45, through which the shaft 34 extends. The pulley 46 is fixed to the shaft 34 by a screw 47 or other suitable fastening means, and is adapted to be connected to a driving means, not shown, for moving the valve 26 from open to closed position.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What I claim is:

1. A valve structure comprising a housing having a cylindrical chamber connecting a pair of tubes provided and arranged as inlet and outlet ports therefor, having offset center lines relative to each other, said chamber being also formed with a central opening with a cover wall formed as an extension of the chamber of greater inside diameter and provided with an annular groove, one of said tubes being formed as an elbow having a radius adapted to effect centering of the tube passage adjacent the chamber relative thereto, with the other of said tubes opening into said chamber at right angles relative thereto, a bearing sleeve slidably mounted inside the chamber having an aperture formed in the side thereof in registry with the tube opening into the chamber at right angles, said sleeve being formed in two parts with adjacent edges angularly displaced relative to the center line of the chamber to bisect the center line of the tube entering at right angles, with each of said adjacent edges being cut back along the outer periphery thereof to provide opposed annular shoulders, an annular T-shaped seal in engagement between said two parts of the sleeve with the stem portion thereof extending toward the axis of the chamber and the opposed top portions seated on said shoulders, a cylindrical valve body rotatably mounted within the sleeve having a passage formed at substantially the same radius as that of said elbow and adapted for registry therebetween in a fully open position, to form a passage of uniform dimensions between the said tubes, said valve body being provided with rotation means comprised of a centered stem formed as an extension of said valve body rotatably carried by a cover mounted over the central opening of the chamber with its outer periphery positioned adjacent to the cover wall, a retainer ring positioned in the cover wall groove in engagement with the cover, an apertured cup encircling the valve stem with the rim thereof in engagement with the sleeve, a stem seal means positioned around the stem in engagement with the cover, and a coil spring bottomed in said cup acting against said stem seal for cooperatively urging the sleeve inwardly of the chamber and the stem seal outwardly against the cover.

2. A valve structure comprising a housing having a cylindrical chamber connecting a pair of tubes provided and arranged as inlet and outlet ports therefor, having offset center lines relative to each other, said chamber being also formed with a central opening with a cover wall formed as an extension of the chamber of greater inside diameter and provided with an annular groove, one of said tubes being formed as an elbow having a radius adapted to effect centering of the tube passage adjacent the chamber relative thereto with the other of said tubes opening into said chamber at right angles relative thereto, a bearing sleeve slidably mounted inside the chamber, said sleeve being formed in two sections having obtusely correlated edges in said chamber, each of said correlated edges being formed with a rabbet extending around its outer periphery whereby a T-shaped slot is provided between said sections, a T-shaped seal in said slot with the stem portion extended interiorly of the sleeve, one of said sections being formed with an opening in the side thereof in registry with the tube opening into the chamber at right angles, said one section being formed and arranged with correlated securing means extending between said section and the chamber to restrict it to slidable movement, a cylindrical valve body rotatably mounted within the sleeve having a passage formed at substantially the same radius as that of said elbow and adapted for registry therebetween in a fully open position to form a passage of uniform dimensions between the said tubes, said valve body being provided with rotation means comprised of a centered stem formed as an extension of said valve body rotatably carried by a cover mounted over the central opening of the chamber with its outer periphery positioned adjacent to the cover wall, a retainer ring positioned in the cover wall groove in engagement with the cover, an apertured cup encircling the valve stem with the rim thereof in engagement with the sleeve, a stem seal means positioned around the stem in engagement with the cover, and a coil spring bottomed in said cup acting against said stem seal for cooperatively urging the sleeve inwardly of the chamber and the stem seal outwardly against the cover.

EDWIN F. PAIN.

REFERENCES CITED

The following references are of record in the file of this patent:

UNITED STATES PATENTS

| Number | Name | Date |
|---|---|---|
| 1,898,952 | Gray | Feb. 21, 1933 |
| 1,977,592 | Reure | Oct. 16, 1934 |

FOREIGN PATENTS

| Number | Country | Date |
|---|---|---|
| 3,184 | Great Britain | Feb. 13, 1884 |
| 9,032 | Great Britain | May 31, 1889 |
| 118,800 | Australia | Aug. 9, 1944 |
| 710,360 | France | June 8, 1931 |